United States Patent [19]
Chen

[11] Patent Number: 5,393,814
[45] Date of Patent: Feb. 28, 1995

[54] POLYOLEFIN COMPOSITION

[75] Inventor: Bing-Lin Chen, Germantown, Tenn.

[73] Assignee: Witco Corporation, Greenwich, Conn.

[21] Appl. No.: 153,779

[22] Filed: Nov. 17, 1993

[51] Int. Cl.⁶ .............................................. C08K 5/20
[52] U.S. Cl. .................................................. 524/219
[58] Field of Search ........................................ 524/219

[56] References Cited

FOREIGN PATENT DOCUMENTS 1994054  5/1969  Germany .............................. 524/219

Primary Examiner—Peter D. Mulcahy
Attorney, Agent, or Firm—Lockwood, Alex, Fitzgibbon & Cummings

[57] ABSTRACT

A composition of matter comprising a polyolefin and an effective amount of at least one alkenyl monoamide of a dicarboxylic acid wherein the alkenyl group has from about 12 to about 24 carbon atoms.

9 Claims, No Drawings

POLYOLEFIN COMPOSITION

BACKGROUND AND DESCRIPTION OF THE INVENTION

This invention relates to polyolefinic polymers having improved properties. In particular this invention relates to improving the slip and ink adhesion of polyolefinic compositions comprising a polyolefin and an N-alkenyl monoamide of a dicarboxylic acid.

Olefin homopolymers and copolymers are of commercial importance for the manufacture of numerous articles such as films and other items. In order to be useful for many of these functions it is desirable that the polyolefinic composition have good slip characteristics. This can be determined by measuring the coefficient of friction of the polyolefin. It is also important that the polyolefinic composition have good printability and adhesion to water-based inks, as these become more widely used in industries that engage in printing on them.

In order to obtain a satisfactorily low coefficient of friction, often slip agents are added to the polyolefin to lower its coefficient of friction below about 0.5, preferably below 0.3. Many slip agents and other additives for polyolefins are disclosed in the literature. These additives will lower the coefficient of friction of the polyolefin to desired levels, permitting ready handling of shaped articles and films prepared from the polyolefinic material. Polyolefinic polymers having poor slip characteristics are difficult to handle when the polymer is manufactured in the customary manner of large rolls. During storage and subsequent processing, the low slip films tend to adhere layer to layer or block together. Also such films can encounter large frictional forces in processing equipment that often cause distortions and even tearing of the film, especially when using thin film.

Haeske et al U.S. Pat. No. 3,266,924 discloses the blending of a mixture of finely divided siliceous material and a fatty acid amide slip agent into polyethylene to enhance its slip and blocking properties. Ross et al U.S. Pat. No. 3,326,840 discloses the incorporation of a small amount of a mono-N-substituted saturated carboxylic acid amide of the formula:

wherein R is an aliphatic acylradical having from 12 to 30 carbon atoms and R' is an aliphatic group having from 1 to 6 carbon atoms, especially an alkylol group, into a copolymer of ethylene and an aliphatic ethylenically unsaturated carboxylic ester to improve its resistance to blocking and improve its slip properties.

Foster U.S. Pat. No. 3,647,738 discloses blending an amide having the formula:

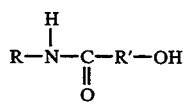

wherein R is an alkenyl radical having 18 to about 22 carbon atoms and R' is a divalent hydrocarbon radical containing 3 to 15 carbon atoms with an alpha-olefin polymer composition to provide compositions having low blocking and no bloom characteristics and high slip properties.

While the foregoing patents and other literature disclose a variety of additives that improve the slip and/or blocking properties of the polyolefins, it is also necessary that the polyolefinic compositions containing the slip agents have excellent ink adhesion, particularly to water based inks and printability so that the film or other item made from the polymer can be suitably printed. Of late it has become highly desirable for environmental reasons such as to reduce emission of volatile organic compounds, that the inks used to print on the polyethylene composition be water-based inks.

Accordingly it is an object of the present invention to improve the slip properties of polyolefins.

Still another object of the present invention is to improve the adhesion of water based inks to polyolefins.

Still another object of the present invention is to improve the ink adhesion of water-based inks to polyolefins containing materials for improving the slip properties of the polyolefins.

Also an object of the present invention is the prevention of polyolefin films from adhering to each other during storage.

Another object of the present invention is to impart the desired slip, printability and adhesion to water-based inks to polyolefin compositions without adversely affecting the optical properties of the polyolefin.

Other objects of the present invention will become apparent from the ensuing description.

The compositions of this invention having improved slip and good adhesion of water based inks comprise a polyolefin polymer and an effective amount of an alkenyl monoamide of a dicarboxylic acid, preferably maleic acid monoamide and optionally an effective amount of a finely divided inorganic material. The method of the present invention comprises incorporating an effective amount of the alkenyl monoamide and optionally an effective amount of a finely divided inorganic material into a polyolefin polymer forming a polyolefin composition having a lower coefficient of friction, excellent printability and good adhesion of inks, particularly water-based inks.

Suitable alkenyl monoamides useful in this invention have the structure:

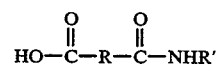

wherein R is a divalent hydrocarbon group of 2 to 20 carbon atoms and R' is an alkenyl group of 12 to 24 carbon atoms. The preferred compounds are the reaction product of equal moles of a cyclic dicarboxylic acid anhydride, such as maleic anhydride, succinic anhydride, cyclic adipic anhydride, alpha alkenyl substituted succinic anhydride such as alpha-octadecyl-succinic anhydride, itaconic anhydride, phthalic anhydride, etc., and an N-alkenylamine.

The polyolefins composition of this invention have improved slip properties, as evidenced by their lower coefficient of friction and improved adhesion to inks, particularly water-based inks. The polyolefins can be homopolymers and copolymers and mixtures thereof.

Among the polyolefins of this description are ethylene and propylene homopolymers and copolymers. Polyethylene can be low density and high density polymeric material. Linear low density polyethylene is in general a copolymer of ethylene and up to about 10 weight percent of a second olefin, such as propylene, butene, hexene or octene. High density polyethylene is normally a homopolymer.

There are, basically, two types of olefin polymerization techniques for preparing high molecular weight olefin polymers and copolymers. The oldest commercial techniques involve high pressure, high temperature, and the use of a free radical initiator, such as a peroxide; these type polymers are generally known as low density polyethylene (LDPE). These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but are generally used at very low or intermediate pressures. The products made by these coordination catalysts are generally known as "linear" polymers because of the substantial absence of branched chains of polymerized monomer units pendant from the main polymer "backbone", and they are also generally known as high density polyethylene (HDPE). Linear polyethylene (HDPE) ordinarily has a density in the range of 0.941 to 0.965 gms/cc.

Also used in the present invention are "linear" type ethylene polymers wherein ethylene has been polymerized along with minor amounts of alpha, beta, ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl side chains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the highest alkene comonomers impart high "block" characteristics to extrusion-cast films and the high "slip" (i.e. low coefficient of friction) characteristic inherently found in HDPE is diminished.

Other homopolymers which can be used include: polypropylene, polybutene-1, poly(4-methylpentene-1) and the like.

Exemplary of the copolymers of olefinically unsaturated aliphatic hydrocarbons which are preferred are ethylene-propylene copolymers, containing about 1 to about 99% by weight, based on the total copolymer, of propylene copolymerized therein, ethylene-butene-1 copolymers containing about 1 to about 99%, based on the total copolymer of butene-1 copolymerized herein ethylene-hexene-1 copolymers containing about 1 to about 99% by weight based on the total copolymer of hexene-1 copolymerized therein and the like.

The homopolymers and copolymers of olefinically unsaturated aliphatic hydrocarbons referred to above can be made by either free radical catalyzed high pressure techniques or anionic catalyzed low pressure techniques known in the art and described in "Crystalline Olefin Polymers" Part I by R. A. V. Raff and K. W. Doak, Interscience Publishers, NYC 1965 which is incorporated herein by reference.

The ethylene-acrylic acid interpolymers ethylenemethacrylic acid interpolymers, ethylene-vinyl acetate interpolymers and ethylene-alkyl acrylate methacrylate interpolymers can be made by the free radical, random interpolymerization of ethylene with the corresponding comonomer using methods well known in the art including bulk, solution, aqueous suspension, non-aqueous dispersion and emulsion techniques in either batch or continuous process.

The melt index of the ethylene/vinyl acetate copolymers of this invention can range from about 0.01 to 500 dg/min. with a range of about 0.2 to 20 dg/min being preferred. These ethylene-vinyl acetate copolymers preferably contain about 1.5 to about 20% by weight of vinyl acetate copolymerized therein.

There are numerous polyolefin resins useful in the present invention. For example, Rexene high molecular weight, low density polyethylene resins made by the polymerization of ethylene using a free radical initiator at high pressure and high temperature was used in the experimental work reported in Example 2. These polyethylene resins have the following properties:

Density 0.921 grams/cc
Melt Index 1.0 grams/10 minutes
Tensile (yield) 1500 psi
Tensile (at break) 2100 psi
Ultimate Elongation 500%
Secant Modulus 50,000 psi
Hardness 48 Shore D
Softening Point (Vicant) 200° F.

Among other polyolefins useful in the present invention are high molecular weight, polypropylene, such as Petrothene PP 8000-GK of Quantum Chemical Co. which has a density between about 0.89–0.91 grams/cc and a melt index of 5.0 grams/10 minutes and ethylene-vinyl acetate copolymer resins such as Rexene PE 1335 which has a density of 0.924 grams/cc; a melt index of 2.0 grams/10 minutes, and a vinyl acetate content of 3.3%. These materials are merely representative of polyolefins useful in the present invention which are numerous and can be selected depending upon the desired properties of the final composition.

Various additives are often incorporated into the polyolefin. One such group of additives are antioxidants such as hindered phenols, phenolic phosphites, secondary arylamines and the like. These antioxidants are used in quantities between about 0.01 to about 1 weight percent of the polymer. Other additives such as colorants, anti-blocking agents, antistatic agents and lubricants are commonly used. Also lubricants are often incorporated into polyolefin compositions, particularly polypropylene and high density polyethylene in order to improve the processability of the polymer.

The polyolefin compositions of the present invention comprise polyolefin polymer and an effective amount of the aforedescribed monoamide and optionally an effective amount of a finely divided inorganic material sufficient to improve the slip properties of the polyolefin and also improve the adhesion of water-based inks, thereto.

Slip is the ability of films of the polyolefins to slide past one another. Antiblocking is the ability of films of the polyolefins to avoid adhering to one another and to separate from one another. Printability is the ability for the films to be printed. Adhesion is retention of the ink on the film.

As previously indicated, there are many materials known to improve slip and blocking properties of films. Since environmental concerns have arisen as to organic solvents, it has become desirable to use water-based inks. The solvent-based inks previously used are often considered to be environmentally undesirable. The materials previously used as slip and antiblocking agents such as unsubstituted amides of long-chain fatty acids, particularly erucamide, do not provide the polyolefinic polymer with the desired adhesion to water-based inks. This property is provided by the present compositions and method.

In general the composition and methods of the present invention require that the polyolefin contain an effective amount of the N-alkenyl monoamide. The amount will vary depending on several variables, particularly the particular polyolefin and the selection of the N-alkenyl monoamide. Certain of the N-alkenyl monoamides are more effective in the polyolefins and thus lower concentrations can be used in the polymer to obtain the desired properties. The amount of N-alkenyl monoamide that is useful in the present compositions and methods is between about 0.1 and about 0.5 weight percent of the polyolefin.

The N-alkenyl monoamides of this invention are preferably prepared by reacting a suitable cyclic dicarboxylic acid anhydride with primary amine in 1:1 molar ratio. Primary amines preferred for the present invention are unsaturated primary amines of about 12 to 24 carbon atoms, and preferably from 16 to 22 carbon atoms. Representative amines are fatty amines such as oleyl amine and erucyl amine. Included among the monoamide compounds useful in the present invention are N-erucyl maleic acid monoamide and N-oleyl maleic acid monoamide.

Optionally, the compositions of the present invention may contain components in addition to the monoamides which further the improvement of the slip properties and adhesion of the water-based ink of the polyolefin polymer. For example, it has been found that the addition of a finely divided inorganic material can enhance the slip and adhesion to water-based inks of the polyolefin compositions of the present invention. Thus the coefficient of friction of the polyolefin which is lowered by the addition of an effective amount of a monoamide in accordance with the present invention, can often be lowered further by the presence of an effective amount of finely divided inorganic material. In general the presence of from about 0.05 to about 1.0, preferably from about 0.1 to about 0.5, weight percent of the finely divided inorganic material in the polyolefin composition will be of value in lowering the coefficient of friction and improving the water based ink adhesion of the polyolefin polymers. Examples of these finely divided materials are silica, mica, talc, diatomaceous earth and calcium carbonate.

The polyolefin composition of the present invention can be prepared by admixing the polyolefin polymer, the monoamide and the finely divided inorganic material, if one is used, by various methods.

One method of preparation is to blend a masterbatch of the polyolefin polymer containing the monoamide and other additives. This can be accomplished by grinding polyolefin pellets in a mill to form a coarse granule. The monoamide and other additives are melted onto the surface of the polyolefin granules with the use of a heat lamp. Then the granules are mixed and the mixture is extruded through a capillary die to form a strand which is pelletized. If desired, the pelletizing procedure can be repeated as many times as desired so as to insure adequate mixing of the components.

The masterbatch can then be added to virgin polyolefin polymer by shaking and tumbling the masterbatch and polyolefin pellets. Then the mixture can be converted into the desired product by cast extrusion, blow molding, blow extrusion, or other commercial method.

When an extrusion is desired the mixture can be extruded through a two-stage mixing screw with a 3:1 compression ratio and a 20:1 length:diameter ratio, although other equipment can be used. The temperature of the barrel and die are controlled. As the molten plastic tube emerges from the die it can be blown with air to the predetermined diameter and cooled with air.

Also the composition of the present invention can be cast into film by extrusion through a slot die using a simple screw extruder having characteristics such as those for the aforedescribed two-stage mixing screw. Similar test results are obtained from cast film as with blown films. Following are the procedures used for testing polyolefin compositions containing maleic acid monoamides in accordance with the present invention.

When additives of the present invention are used at effective levels, improvements in printability and ink-adhesion are seen. In the absence of a suitable ASTM test for measuring printability and ink-adhesion properties, the following printability test was devised. Samples of polyolefin films ($10'' \times 5''$) are corona treated in two paths for a total of 100 seconds using a High Frequency Corona Treater equipped with a $2\frac{5}{8}''$ field effect electrode, Model BD-20C, made by Electro-Technic Products, Inc. The field effect electrode is held at about 1.0–1.5 cm from the film surface during corona treatment. Printability testing is done on the film one week after the corona treatment A $10'' \times 2\frac{3}{4}''$ print stripe is made on the film with a water-based ink, Hydropoly Red ink, S89-4710B, from Sun Chemical Co., using a spring-loaded handproofer having 2-182 inch printing width The printed film is dried in an oven at 160° F. for 20 seconds. The appearance of the print is rated good (G), fair (F), or poor (P), with respect to the smoothness of ink coverage and the presence of visible pinholes.

Ink adhesion is evaluated by hand-pulling a piece of Scotch 600 tape off the printed surface to determine the amount of ink which stays on the surface. A scale of 0 to 10 was used with 0 representing 0 ink adhesion and 10 representing 100% of ink adhered to the printed surface. Two replicates were used, with the average value reported.

The coefficient of friction was determined by ASTM D1894-75, moving sled/stationery plane test method, using an Instron 1130 Universal Testing Instrument. Slip measurements were made one week after extrusion on five different film segments and the average reported. A coefficient of friction of $>0.5$ is considered poor; 0.30 to 0.5 —fair and $<0.30$ —desirable.

Example 1 describes the preparation of N-erucyl maleic acid monoamide.

EXAMPLE 1

Preparation of N-Erucyl Maleic Acid Monoamide

A 250 ml, 3-neck flask equipped with a stirrer, thermometer, Dean-Stark receiver and condenser was charged with 18 g of maleic anhydride (0.18 mole) and 60 ml carbon tetrachloride. Erucyl amine (59.0 g, 0.18 mole) was added dropwise at 70° C. under a nitrogen atmosphere. The mixture was stirred at 75° C. for 4 hours. The temperature was raised to 90° C. to distill out carbon tetrachloride and the mixture was then stripped at 100° C. 10 mmHg vacuum for 15 minutes to afford 73 g of N-Erucyl-maleic acid monoamide. An IR spectrum indicated the presence of amide and carboxyl groups. This product had an acid number of 135; no total amine value; a saponification value of 137.6; a melting point of 55° C.

The following examples were performed with various polyolefinic compositions containing the maleic acid monoamides of the present invention and with a control containing no additive.

EXAMPLE 2

N-Erucyl maleic acid monoamide and N-oleyl maleic acid monoamide were incorporated into low density polyethylene resin. Then the resulting compositions were extrusion blown to form films. The low density polyethylene resin was Rexene high molecular weight, low density polyethylene resin previously described. The coefficient of friction (COF), printability and adhesion to water-based inks of each composition were determined by the previously discussed procedures. Compositions containing erucamide, a commercial slip agent, and MicroKen 801 diatomaceous earth were tested as comparison for the amide of the present invention. Also a composition comprising low density polyethylene without a slip agent and compositions containing the slip agent in combination with Microken 801 diatomaceous earth were tested, with the following results:

| Erucamide (ppm) | N-Erucyl Maleic Acid Monoamide (ppm) | N-Oleyl Maleic Acid Monoamide (ppm) | Micro-Ken 801 (ppm) | C.O.F. | Ink Adhesion |
|---|---|---|---|---|---|
| 0 | 0 | 0 | 0 | 0.95 | 10 |
| 0 | 0 | 0 | 1500 | 0.73 | 10 |
| 2000 | 0 | 0 | 0 | 0.20 | 0 |
| 2000 | 0 | 0 | 1500 | 0.14 | 0.5 |
| 0 | 2000 | 0 | 0 | 0.53 | 10 |
| 0 | 2000 | 0 | 1500 | 0.29 | 10 |
| 0 | 0 | 2000 | 0 | 0.75 | 10 |
| 0 | 0 | 2000 | 1500 | 0.42 | 10 |

In each experiment, the printability was good.

EXAMPLE 3

The procedures of Example 2 was repeated with ethylene vinyl acetate copolymer resin compositions containing N-erucamide, a commercial slip agent, N-erucyl maleic acid monoamide and MicroKen 801 diatomaceous earth, with results as follows:

| Erucamide (ppm) | N-Erucyl Maleic Acid Monoamide (ppm) | MicroKen 801 (ppm) | C.O.F. | Ink Adhesion |
|---|---|---|---|---|
| 0 | 0 | 0 | >1.0 | 10 |
| 0 | 0 | 3000 | 0.94 | 10 |
| 2000 | 0 | 0 | >1.0 | 0 |
| 2000 | 0 | 3000 | 0.12 | 0 |
| 0 | 2000 | 3000 | 0.31 | 8.7 |

In each experiment, the printability was good.

As can be seen from the results of the experimental data, the use of specific maleic acid monoamides in polyolefins improves the slip of the polyolefins and also improves adhesion to water-based ink. Furthermore the maleic acid monoamide can be used in combination with finely divided inorganic material. This combination of components enhances the increase in slip and ink adhesion of the polyolefinic compositions. These optional materials generally have a particle size of from 0.1 to about 100 microns, or higher. Included among the finely divided inorganic materials useful in combination with the maleic acid monoamides in the present invention are silica, mica, talc, diatomaceous earth and calcium carbonate. The finely divided inorganic material is generally used in amounts of from about 0.05 to about 1.0, preferably from about 0.1 to about 0.5 weight percent of the weight of the polyolefin polymer.

A corona discharge is a treatment often used in this industry to improve the ink adhesion and printability of polymers. This treatment can also be used to enhance the properties of the polyolefin compositions containing the maleic acid monoamide in accordance with this invention. Other like treatments can also be used with the methods and compositions of this invention. It should be noted that 100 seconds corona treatment is used in this invention to distinguish various additives. Prolonged corona treatment of polyolefins usually results in better ink-adhesion to water-based ink.

It should be understood that the embodiments of the present invention which have been described are merely illustrative of a few of the applications of the principles of the present invention. Numerous modifications may be made by those skilled in the art without departing from the spirit and scope of the invention.

I claim:

1. A composition of matter comprising a polyolefin and from about 0.1 to about 0.5 weight percent of the polyolefin of at least one alkenyl monoamide of a dicarboxylic acid having the structure:

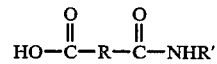

wherein R is a divalent hydrocarbon group of 2 to 20 carbon atoms and R' is an alkenyl group of 12 to 24 carbon atoms.

2. The composition of claim 1, wherein the polyolefin is a homopolymer or a copolymer of ethylene or a homopolymer or a copolymer of propylene.

3. The composition of claim 2, wherein the polyolefin is a low density polyethylene or ethylene-vinyl acetate copolymer.

4. The composition of claim 1, wherein the alkenyl monoamide is a monoamide of a cyclic dicarboxylic acid anhydride.

5. The composition of claim 1, wherein the alkenyl monoamide is the monoamide of maleic acid.

6. The composition of matter of claim 5 wherein the maleic acid monoamide is N-erucyl maleic acid monoamide.

7. The composition of matter of claim 5 wherein the maleic acid monoamide is N-oleyl maleic acid monoamide.

8. The composition of matter of claim 5 which also contains an effective amount of a finely divided inorganic material.

9. A composition of matter comprising a polyolefin and an effective amount of improve slip and blocking properties of at least one alkenyl monoamide of a dicarboxylic acid having the structure:

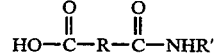

wherein R is a divalent hydrocarbon group of 2 to 20 carbon atoms and R' is an alkenyl group of 12 to 24 carbon atoms.

* * * * *